United States Patent [19]

Campbell, Jr. et al.

[11] 4,141,387
[45] Feb. 27, 1979

[54] UNIVERSAL STEAM TRAP INSULATOR

[75] Inventors: George E. Campbell, Jr., Glen Riddle; Joseph W. Nelson, Lansdowne; Gordon A. Russell, Strafford, all of Pa.

[73] Assignee: Suntech, Inc., Wayne, Pa.

[21] Appl. No.: 852,871

[22] Filed: Nov. 18, 1977

Related U.S. Application Data

[63] Continuation-in-part of Ser. No. 754,070, Dec. 27, 1976, abandoned.

[51] Int. Cl.² .............................................. F16L 59/04
[52] U.S. Cl. ................................... 138/158; 138/167; 138/DIG. 2
[58] Field of Search ............... 138/156, 178, 168, 167, 138/DIG. 2, 161, 92, 158–159, 160, 151, 128; 137/375, 382, 382.5

[56] References Cited

U.S. PATENT DOCUMENTS

| 2,160,009 | 5/1939 | Walker | 138/158 |
| 2,258,176 | 10/1941 | Denning | 138/158 |
| 3,410,522 | 11/1968 | Daghe et al. | 138/92 |
| 3,556,158 | 1/1971 | Schneider | 138/156 |

Primary Examiner—Richard E. Aegerter
Assistant Examiner—L. Footland
Attorney, Agent, or Firm—J. Edward Hess; Donald R. Johnson; Anthony Potts, Jr.

[57] ABSTRACT

An insulator having a universal configuration can be placed around many different types of steam traps. The insulator comprises a housing having suitable openings for water drainage and testing of the trap by an ultrasonic probe, and thermal insulation. Use of the insulator results in more efficient operation of the trap and saves energy. One of the outstanding features of the insulator is its ease of installation.

20 Claims, 5 Drawing Figures

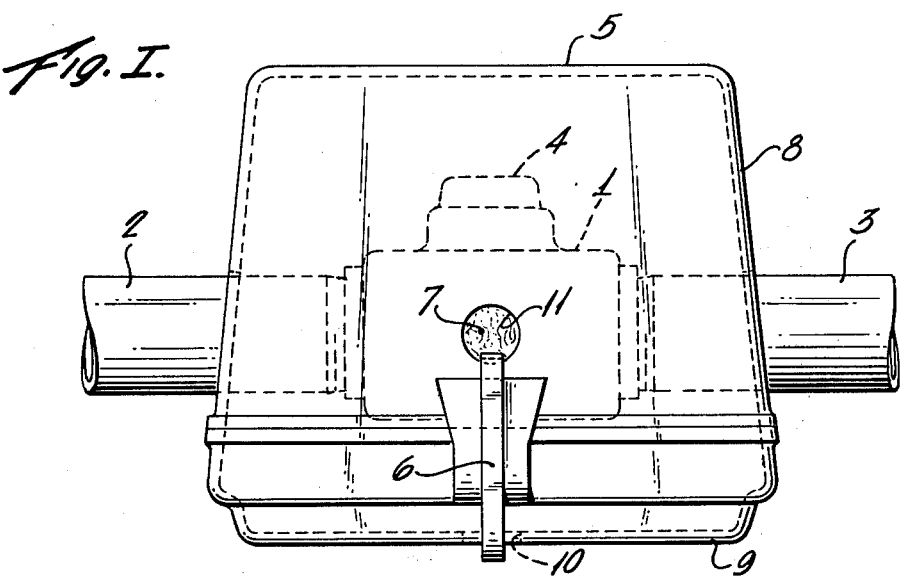
Fig. I.
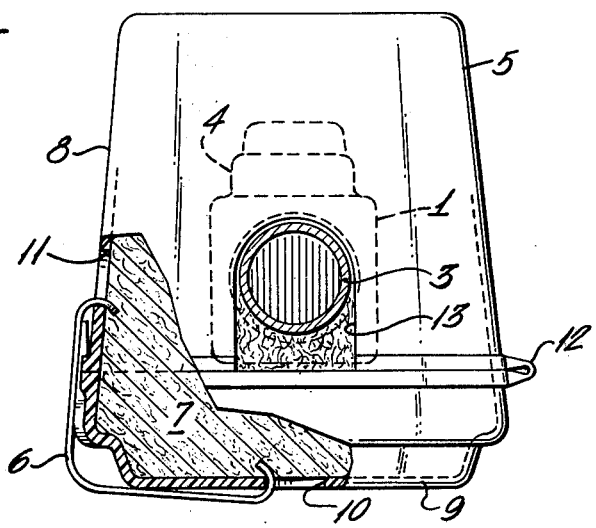
Fig. II.
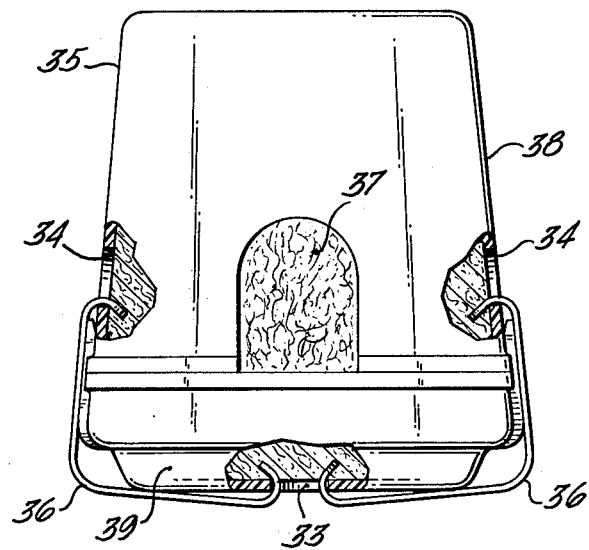
Fig. III.

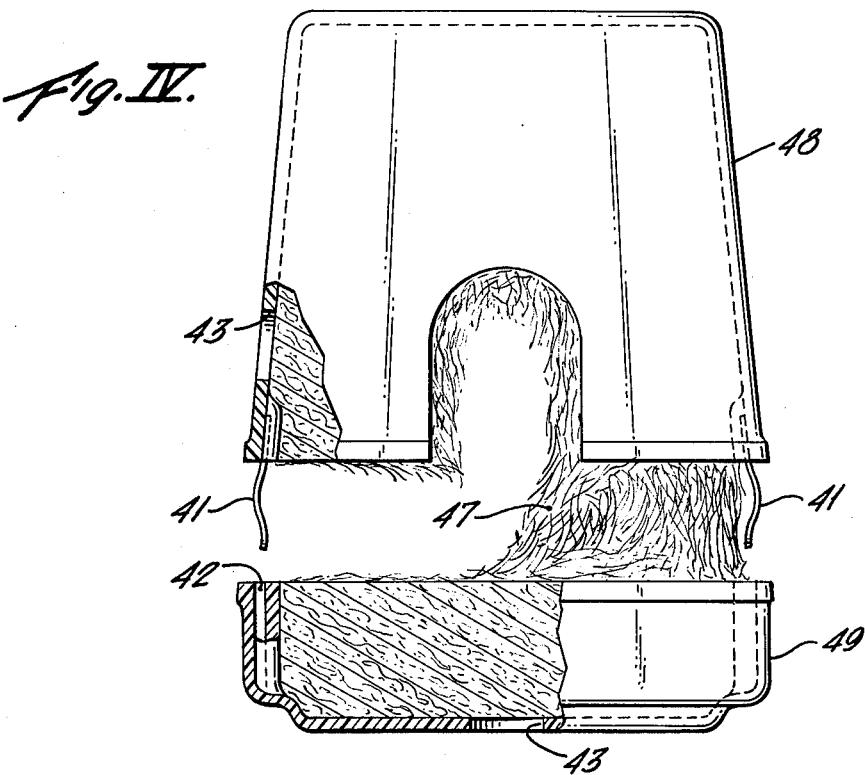
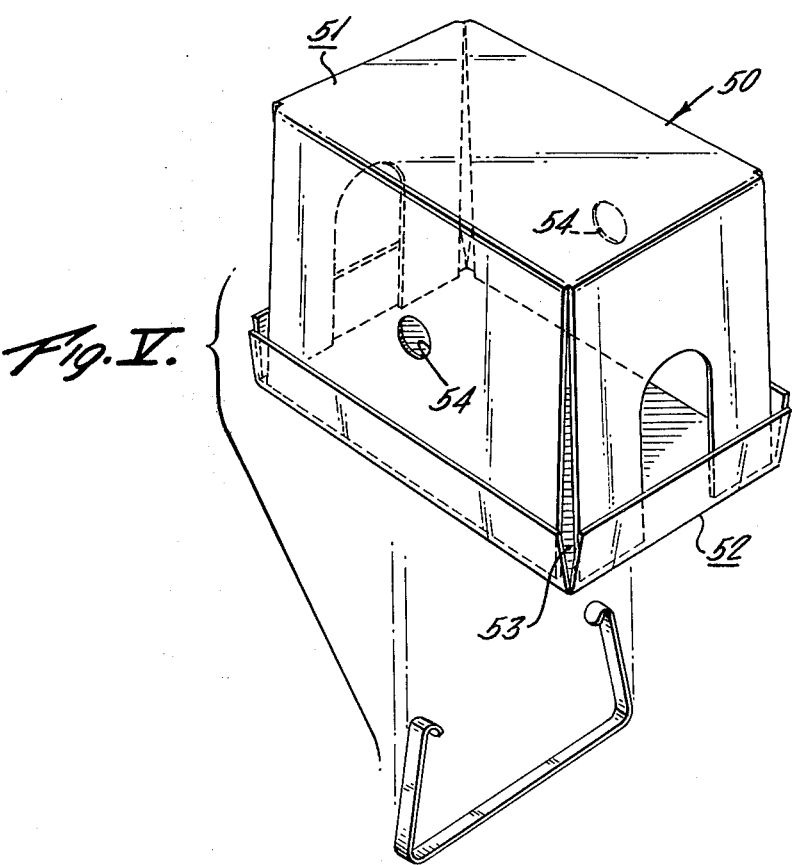

UNIVERSAL STEAM TRAP INSULATOR

RELATED APPLICATIONS

This application is a continuation-in-part of U.S. application Ser. No. 754,070, filed Dec. 27, 1976, now abandoned.

BACKGROUND OF THE INVENTION

Present invention relates generally to a steam trap and particularly to an insulator for a steam trap. More particularly, the invention relates to a universal insulator for a steam trap. Even more particularly, the invention relates to a universal insulator having a protective shell. The use of the insulator can result in significant savings of energy and also reduce trap wear thereby increasing trap life.

A steam trap is a device that automatically obstructs the passage of steam, e.g., from a pipe, but permits the escape of condensate or entrained air. Different types and designs of traps exist and are disclosed in the literature, e.g., see Engineer's Illustrated Thesaurus, Herbert Herkimer, 1952, Chemical Publishing Co.

Insulation, e.g., fiber glass or asbestos, has been tailored to an individual pipe accounterment by wrapping, fitting and cutting. Such individual tailoring is expensive because of the time required. Further, such insulation can be damaged by various means and/or absorb moisture, particularly if used outdoors and as a result suffers a decrease in thermal resistance.

Also, U.S. Pat. No. 3,556,158 discloses an insulator for use with various pipe accounterments including steam traps. The insulator is preformed blocks of polyurethane having a flat surface, the blocks are forced against a pipe accounterment and the surfaces of the blocks deform and assume a shape conforming to the contour of the accounterment. While the surfaces of the blocks facing the accounterment can be easily deformed, the external surfaces of the blocks are of sufficient strength to withstand surface abuses and act also as a vapor barrier. Also, the blocks can have external circumferential recesses to accomodate bonding to hold the blocks together when placed juxtaposed to the pipe accounterment.

In contrast, present invention does not require any additional modification, i.e., the forming of the internal shape required by forcing the blocks against the pipe accounterment. The only effort required is to place the sections of the universal insulator around the steam trap, and bring the sections together. In a preferred embodiment the sections can be held together by positive closure means. Also, the deformed block insulator does not provide any positive drainage if water collects between the blocks around the pipe accounterment. In contrast, present invention provides positive means for such drainage.

SUMMARY OF THE INVENTION

Disclosed is a steam trap insulator having a universal configuration which can be placed around many different types of steam traps. The insulator comprises a housing, having suitable means for water drainage and testing of the trap, without dismantling, by an ultrasonic probe, and thermal insulation. It is relatively simple to install in a plant, provides effective and inexpensive insulation for a steam trap, and is of such a configuration as to fit many different shaped steam traps. Further, because the insulator is of a configuration which permits it installation on many different shaped and sized traps, plant inventory requirements are minimized. Still further, installation of the universal insulator takes only a few seconds by an inexperienced worker. Both minimum inventory requirements and ease of installation are significant features, considering that thousands of steam traps are used in many industrial plants.

BRIEF DESCRIPTIONS OF THE DRAWINGS

FIG. I is a side view of one embodiment of the universal steam trap insulator enclosed about an installed steam trap.

An end view and a partial cutaway of the insulator in FIG. I is shown in FIG. II. Both Figures show the use of a hinged container and one closure means.

FIG. III shows another embodiment of the universal insulator (end view, without the trap) which does not use a hinged container while using two closure means.

FIG. IV shows still another embodiment of the universal insulator (end view, both sections separated, without the trap) wherein one section of the container has closure means which are inserted in spaces provided in the other section of the container. Also shown in FIG. IV is the insulation as one piece of glass fiber mat.

FIG. V is an isometric sketch of another embodiment of the universal insulator using positive closure means, but shown without insulation or a trap.

DESCRIPTION OF EMBODIMENTS

FIG. I shows a side view of one embodiment of the universal steam trap insulator. A steam trap 1 is shown in dashed lines, and has an inlet means 2 and an outlet means 3. The steam trap has a top 4 which forms a thermodynamic chamber for the trap. As is known in the art, the rate at which some types of steam traps open is determined by the rate at which the thermodynamic chamber 4 is cooled. If the chamber is cooled more rapidly, the steam trap will recycle more often, thereby discharging condensate more often but also discharging steam more often. A steam trap is ideally designed to discharge the condensate or entrained air while minimizing the discharge of steam as every discharge of steam is a waste of energy. In many situations it would be desirable to have the steam trap open only very infrequently. In accordance with the present invention the rate of cooling of the thermodynamic chamber 4 is slowed by placing insulation around the entire steam trap and in particular by placing an insulated housing around the trap.

In FIG. I the housing 5 consists of two sections, 8 and 9, which protect the insulation means 7. One of the sections, i.e., 8, has apertures (not shown) in its sides. While generally the apertures are opposite each other, such a configuration is not a requirement. The apertures are formed at the joinder of the sections 8 and 9 when the sections are placed around a steam trap and closed together. The apertures permit inlet 2 and outlet means 3 for the trap to enter and leave the housing 5. The sections also contain insulation means, which insulate the steam trap after the sections are closed around the steam trap. Also the housing has at least one additional aperture, e.g., opening 10 or 11, which permits an ultrasonic probe to be inserted to test the steam trap without requiring the steam trap to be dismantled. The housing can have additional apertures located at other locations but the number should be minimized because of costs. Also, the same opening, e.g., opening 10, permits water, if any collects, to drain from the closed housing. The two sections can be held together by positive closure means, e.g., a clip 6. Positive closure means include such devices as fasteners. Ends of the positive closure means, e.g., clip 6, can be inserted in openings 10 and 11. Use of the openings 10 and 11 for more than one purpose reduces the cost of manufacturing the housing.

FIG. II is an end view of the universal insulator surrounding the steam trap shown in FIG. I and includes a cutaway portion. The cutaway shows the insulation means 7. In FIG. II the positive closure means 6 is shown holding the two sections 8 and 9 together. The ends of the clip 6 are inserted in the openings 10 and 11. Opening 10 also provides drainage for water if it collects in the closed housing. Water collecting in the housing will reduce the effectiveness of the insulation. Thus positive means to permit the discharge of water is necessary. If the insulator is mounted in a vertical position, compared to the horizontal one shown in FIGS. I and II, any collecting water can drain from the apertures 13 since a water tight contact is not made between the aperture 13 and the housing 5 and means 2 and 3. Openings 10 and 11 also provide means for permitting the insertion of an ultrasonic probe which can determine whether the trap is blowing live steam. Thus the trap can be checked without removal of the insulator. The housing in FIG. II is made of polypropylene which is known to flex without breaking; thus the two sections, 8 and 9, are joined at 12. The housing shown in FIG. 1 was injected molded as one unit.

The lengths of the two legs of the clips shown in FIGS. I, II and IV need not be the same, however, it is preferred that they be equal. Equal lengths permit ease of installation in that it will not matter which leg is inserted in which opening. Generally, a clip will be made of a metal which is flexible and non-corrosive, e.g., stainless steel. Further as shown, the ends of the clip should be rounded for safety reasons.

FIG. III shows an end view of another embodiment of the universal insulator; no trap is shown. In FIG. III, housing 35 protects the insulation means 37 against rain and impact. Two positive closure means 36 are shown holding sections 38 and 39 together. In this embodiment both sections 38 and 39 are separate pieces in contrast to the hinged housing of FIGS. I and II. As shown in FIG. III the two openings 34 are opposite each other and permit the insertion of one end of the closure means, e.g., clips 36. Another opening 33 is shown in the bottom of section 39 and this opening 33 permits the insertion of both of the other ends of clips 36, thereby holding sections 38 and 39 together. An ultrasonic probe can be inserted in the openings 33 or 34, to check the effectiveness of the trap.

FIG. IV shows an end view with a partial cutaway of another embodiment of the universal insulator; no trap is shown. In this Figure the sections 48 and 49 are separated. This embodiment differs from the previous ones in that the closure means consists of inserts 41 in section 48 and openings 42 in the side walls of section 49. The inserts 41 friction fit into openings 42 upon bringing sections 48 and 49 together. The configuration of inserts 41, which have a certain amount of flexibility, provides positive holdings when the inserts 41 are placed in openings 42. The length (running perpendicular to the plane of the drawing) of inserts 41 is sufficient to provide the necessary friction force to hold the sections together and thus generally will not be as wide as the entire length of section 48. Correspondingly, the length (not shown) of the openings (or slots) 42 will be sufficient to accommodate the inserts 41. While two inserts and two slots and a particular location are shown, more can be used, the number depending in part on cost considerations. The location can also vary. FIG. IV also shows that the insulation means 47, e.g., fiber glass mat, is one continuous piece which envelops the trap when sections 48 and 49 are joined together. The insulation covers essentially all of the housing's six interior surfaces. Openings 43 provide drainage for any water that collects in the insulator and can be used via the insertion of an ultrasonic probe to check if the trap is operating properly.

FIG. V shows another embodiment of the universal insulator; trap and insulation not shown. This isometric sketch suggests to one how the two sections of protective housing 50 can be made by stamping the appropriate design out of e.g., sheet metal, and then folding the stamped sheet to form the housing. In contrast to the other embodiments in which the edges of one section sit on the edges of the other section, in this embodiment when the sections are brought together the sides of section 51 fit inside the sides of section 52. The corners, e.g., 53, are not sealed in any manner and thus provide for drainage of water. Openings 54 are opposite each other, and the ends of a single positive closure means, e.g., the clip shown in FIG. VI can be inserted. An ultrasonic probe can be inserted into openings 54 to determine if the steam trap is working effectively.

The housing of the insulator can consist of various materials such as metals, thermoplastics and thermosets. If a metal such as steel is used then the positive closure means can involve the use of magnets. The sections of the housing can be joined together by joining means, examples of which include various hinges. Environmental conditions can require the use of other metals such as aluminum. Exposure of the insulator to higher temperatures is permissible when the housing is made of a metal. The housing can be shaped via various techniques such as bending or stamping sheets into the desired shape. A thermoplastic, for example, polypropylene, can be used for the housing. Polypropylene has one advantage in that the housing can be formed via injection molding, which is an economical and rapid method. A thermostat, e.g., polyester, reinforced with fiber glass, has the advantage of light weight combined with good impact resistance. Other considerations involved in the selection of the material for the housing include its fire resistance.

When the housing consists of two separate sections, the sections can be joined together by various joining means. Included in the joining means are flexible devices including the common double-leaf hinge. Joining means also include the aforementioned polypropylene joinder. The housing also can be considered as having two sections, an upper and lower, or a top and bottom when they are joined together as shown in FIG. II.

The insulation means contained in the housing is a thermal insulation. It can consist of (1) fibrous or cellular mineral matter such as asbestos, glass, silica, rock or slag; (2) fibrous or cellular organic matter such as cane, cotton, rubber, wood or wood bark, including cork; (3) fibrous plastics such as polystyrene or polyurethane. The particular material used for the insulation can vary generally and depends on the desired properties. For example, the ability to be used at a very elevated temperature can be of importance. However, the insulation is in the form of mat or continuous fibrous structure in contrast to the loose fill type. Further because of its fibrous structure the mat permits the passage of moisture. A preferred insulation material is a fiber glass mat because it is relatively inexpensive, easy to cut into the desired shape and flexible and easy to handle and has a good thermal resistance value. A resin is often used in fiber glass for various reasons so the temperature to which the fiber glass can be exposed without change, e.g., discoloration, can depend in part on the particular resin used. Further, when contained in the housing the fiber glass tends to shape itself around the steam trap when the sections are closed around the trap. The thickness of the insulation will vary depending on the size of the trap, the size of the housing and the desired amount of saving.

The savings obtained from the use of the above-disclosed insulator can be appreciable. A typical example is as follows. The dollar saving, by using a universal steam trap insulator with 1" of fiberglass on a disk trap having a cycling activity (bare) six times a minute at 41° F., amounts to about $1.30 per month with steam costing $3.00 per 1000 pounds.

The invention claimed is:
1. A universal steam trap insulator comprising:
 (a) a universal housing having two sections;
 (b) two sides of a section having apertures which are formed at the joinder of the sections when the housing is placed around a steam trap and the sections are closed together;
 (c) fibrous thermal insulation means, contained in the housing, which insulate the steam trap after the sections are closed around the steam trap; and
 (d) the housing having at least one additional aperture which permits water to drain from the closed housing or permits an ultrasonic probe to be inserted to test the steam trap.

2. Insulator according to claim 1 wherein joining means join the two sections together.

3. Insulator according to claim 1 wherein the insulation means is a mat of fiber glass which shapes itself around the steam trap when the sections are closed around the trap.

4. Insulator according to claim 1 wherein positive closure means holds the sections closed.

5. Insulator according to claim 1 wherein the apertures are opposite each other.

6. Insulator according to claim 5 wherein joining means join the two sections together.

7. Insulator according to claim 6 wherein the insulation means is a mat of fiber glass which shapes itself around the steam trap when the sections are closed around the trap.

8. Insulator according to claim 7 wherein a positive closure means holds the sections closed.

9. A universal steam trap insulator comprising:
 (a) a universal housing having two sections;
 (b) two sides of a section having apertures which are formed at the joinder of the sections when the housing is placed around a steam trap and the sections are closed together;
 (c) one section having two holes opposite each other and the other section having one hole located relative to the two holes wherein one end of a metal clip can be inserted in one of the opposite holes and the other end of the clip inserted in the one hole;
 (d) a mat of fiber glass contained in the housing which shapes itself around the steam trap when the sections are closed around the trap; and
 (e) two metal clips wherein one end of each clip is inserted in a different hole which are opposite each other and the other ends of both clips are inserted in the one hole in the other section and the inserted clips hold the sections closed together.

10. A universal steam trap insulator comprising:
 (a) a universal housing having two sections each one having non-water-tight corners;
 (b) two sides of a section having apertures which are formed at the joinder of the sections when the housing is placed around a steam trap and the sections are closed together;
 (c) a mat of fiber glass, contained in the sections, which shapes itself around the steam trap when the sections are closed around the trap; and
 (d) one section having two openings opposite each other which permits the ends of a positive closure means to be placed while holding the sections together.

11. An insulated steam trap comprising:
 (a) a steam trap having an inlet means and an outlet means;
 (b) a universal housing placed around the trap and the housing having a section having apertures which are formed at the joinder of the sections and wherein placed are the inlet and outlet means and the housing having at least one additional aperture which permits water to drain from the housing or permits an ultrasonic probe to be inserted to test the steam trap; and
 (c) fibrous thermal insulation means in the housing which insulate the trap.

12. Trap according to claim 11 wherein joining means join the two sections together.

13. Trap according to claim 11 wherein the insulation means is a mat of fiber glass which shapes itself around the steam trap.

14. Trap according to claim 11 wherein the apertures are opposite each other.

15. Trap according to claim 11 wherein positive closure means holds the sections closed.

16. Trap according to claim 15 wherein the insulation means is a mat of fiber glass shaping itself around the steam trap.

17. Trap according to claim 16 wherein joining means join the two sections together.

18. A universal steam trap insulator comprising:
 (a) a universal housing having two sections;
 (b) two sides of a section having apertures which are formed at the joinder of the sections when the housing is placed around a steam trap and the sections are closed together and further that the apertures have sufficient space around the trap inlet or outlet to permit drainage when the sections are in a vertical position;
 (c) fibrous thermal insulation means, contained in the housing, which insulate the steam trap after the sections are closed around the steam trap; and
 (d) the housing having at least one additional aperture which permits water to drain from the closed housing when the housing is in a horizontal position.

19. Insulator according to claim 18 wherein the fibrous means is a mat of fiber glass which shapes itself around the steam trap when the sections are closed around the trap.

20. Insulator according to claim 19 wherein joining means join the two sections together.

* * * * *